United States Patent
Kurokawa et al.

(10) Patent No.: US 10,162,333 B2
(45) Date of Patent: Dec. 25, 2018

(54) SWITCH APPARATUS THAT GENERATES SAFETY INPUT SIGNALS AND NUMERICAL CONTROL SYSTEM

(71) Applicant: FANUC CORPORATION, Yamanashi (JP)

(72) Inventors: Yuuki Kurokawa, Yamanashi (JP); Yasushi Nomoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/371,139

(22) Filed: Dec. 6, 2016

(65) Prior Publication Data
US 2017/0160723 A1    Jun. 8, 2017

(30) Foreign Application Priority Data

Dec. 8, 2015  (JP) ................................ 2015-239313

(51) Int. Cl.
    *G05B 19/40*     (2006.01)
    *G05B 19/4061*     (2006.01)
    *G05B 9/03*     (2006.01)
    *G05B 19/406*     (2006.01)

(52) U.S. Cl.
CPC .......... *G05B 19/4061* (2013.01); *G05B 9/03* (2013.01); *G05B 19/406* (2013.01); *G05B 2219/34465* (2013.01); *G05B 2219/50193* (2013.01)

(58) Field of Classification Search
None
See application file for complete search history.

(56) References Cited

U.S. PATENT DOCUMENTS

| | | | | |
|---|---|---|---|---|
| 5,157,595 A | * | 10/1992 | Lovrenich | G05B 19/058 700/169 |
| 5,262,954 A | * | 11/1993 | Fujino | G05B 19/4183 700/112 |
| 5,274,546 A | * | 12/1993 | Kinoshita | G05B 19/4063 700/81 |
| 5,656,906 A | * | 8/1997 | Iwashita | G05B 19/19 318/568.23 |

(Continued)

FOREIGN PATENT DOCUMENTS

| CN | 1977444 A | 6/2007 |
|---|---|---|
| CN | 104020900 A | 9/2014 |

(Continued)

*Primary Examiner* — Jason Lin
(74) *Attorney, Agent, or Firm* — Hauptman Ham, LLP

(57) ABSTRACT

A switch apparatus includes: an operation unit that is movable in one direction; a first detection unit that outputs a first detection signal indicative of a distance to the operation unit; a second detection unit that outputs a second detection signal indicative of a distance to the operation unit; a first determination unit that outputs a first safety input signal when the first detection signal is greater than or equal to a first threshold value; a second detection unit that outputs a second safety input signal when the second detection signal is greater than or equal to a second detection signal; and a threshold value adjustment and holding unit that adjusts and holds the first and second threshold values such that when the operation unit moves a predetermined distance, output start timings of the first and second safety input signals become substantially the same.

3 Claims, 6 Drawing Sheets

(56) References Cited

U.S. PATENT DOCUMENTS

| | | | | |
|---|---|---|---|---|
| 5,777,870 A | * | 7/1998 | Takaku | G05B 19/4182 |
| | | | | 370/294 |
| 5,825,150 A | * | 10/1998 | Kachi | G05B 19/4062 |
| | | | | 318/271 |
| 6,150,786 A | * | 11/2000 | Kinoshita | G05B 19/19 |
| | | | | 318/564 |
| 6,211,784 B1 | | 4/2001 | Nishide | |
| 2013/0253706 A1 | * | 9/2013 | Hada | G05B 19/18 |
| | | | | 700/275 |
| 2015/0314364 A1 | * | 11/2015 | Fiessler | B21D 55/00 |
| | | | | 72/1 |

FOREIGN PATENT DOCUMENTS

| | | |
|---|---|---|
| JP | 51-15166 A | 2/1976 |
| JP | 60-27062 A | 2/1985 |
| JP | 11-161326 A | 6/1999 |
| JP | 2002-98773 A | 4/2002 |
| JP | 2005-70922 A | 3/2005 |
| JP | 3140561 U | 4/2008 |
| JP | 2009-33387 A | 2/2009 |

* cited by examiner

SWITCH APPARATUS THAT GENERATES SAFETY INPUT SIGNALS AND NUMERICAL CONTROL SYSTEM

BACKGROUND OF THE INVENTION

1. Field of the Invention

The present invention relates to a switch apparatus that generates safety input signals to be inputted to a numerical control apparatus in order to monitor the safety function of a machine tool, and a numerical control system including such a switch apparatus.

2. Description of the Related Art

Generally, a machine tool uses a computerized numerical control apparatus (hereinafter, referred to as "numerical control apparatus") for movement control of a tool or the like. In order to monitor the safety of the machine tool, it has been common to input duplicated safety input signals to the numerical control apparatus, and to monitor the safety function of the machine tool based on a result of comparison between states of the two safety input signals. FIG. 8 is a view for explaining a conventional technique for full monitoring of the machine tool based on safety input signals generated by a push-button switch. As illustrated in FIG. 8, two contacts 351 and 352 are provided in the push-button switch 300, and a first output signal and a second output signal which are composed of a "high" and a "low" signal, respectively, are inputted to the numerical control apparatus 200 as the first and second safety input signals. In the numerical control apparatus 200, the states of the first and second safety input signals are compared, and when the two safety input signals are non-coincident, it is determined to be in a state in which the safety function of the machine tool controlled by the numerical control apparatus 200 is impaired (in other words, the machine tool is abnormal).

When a safety input signal is duplicated using the push-button switch 300 as illustrated in FIG. 8, due to characteristics specific to the respective contacts 351 and 352 as well as respective signal lines, there is a difference between times from when the contacts 351 and 352 are depressed until when the numerical control apparatus 200 receives the first safety input signal and the second safety input signal (hereinafter referred to sometimes as "response times"). In other words, even when the machine tool is normal, there is a time zone in which the states of the two safety input signals received by the numerical control apparatus 200 are non-coincident, and due to such non-coincidence of the safety input signals, the numerical control apparatus 200 may erroneously determine that "the machine tool is abnormal". Therefore, in order to avoid such erroneous determination, the numerical control apparatus 200 is set up such that a non-coincidence is permitted for a predetermined time. Hereinafter, the time for which it is permitted that the safety input signals are non-coincident is referred to simply as "permissible time".

For example, as described in Japanese Unexamined Patent Publication (Kokai) No Hei 11-161326, there is known a numerical control apparatus that monitors receiver circuits for inputting machine information, wherein two external signals received by the independent receiver circuits are compared, and the receiver circuits are monitored based on a result of the comparison.

FIG. 9 is a view illustrating by way of example a difference in response time between the safety input signals generated by the push-button switch illustrated in FIG. 8. For example, as illustrated in FIG. 9, when the push-button switch 300 is depressed at a time 0, assuming that the numerical control apparatus 200 receives, at a time $t_1$, the first safety input signal transmitted from the contact 351 and receives, at a time $t_2$, the second safety input signal transmitted from the contact 352, the difference between the response times is $\Delta T$ ($t_2-t_1$). However, depending on the structure of the push-button switch 300, a case could occur in which the difference $\Delta T$ in response time between the duplicated safety input signals becomes so great that it exceeds the permissible time P. In this instance, the numerical control apparatus erroneously determines that the safety function is impaired.

SUMMARY OF THE INVENTION

In view of the problems as described above, it is an object of the invention to provide a switch apparatus that generates safety input signals to be inputted to a numerical control apparatus in order to accurately monitor the safety function of a machine tool, and a numerical control system including such a switch apparatus.

In order to achieve the above-described object, the switch apparatus that generates safety input signals to be inputted to a numerical control apparatus in order to monitor the safety function of a machine tool includes: an operation unit that is movable in one direction; a first detection unit that detects a distance to the operation unit and output it as a first detection signal; a second detection unit that detects a distance to the operation unit and outputs it as a second detection signal; a first determination unit that outputs a first safety input signal when the first detection signal is greater than or equal to a first threshold value and does not output the first safety input signal when the first detection signal is smaller than the first threshold value; a second determination unit that outputs a second safety input signal when the second detection signal is greater than or equal to a second threshold value and does not output the second safety input signal when the second detection signal is smaller than the second threshold value; and a threshold value adjustment and holding unit that adjusts and holds the first threshold value and the second threshold value such that when the operation unit moves a predetermined distance, an output start timing of the first safety input signal from the first determination unit and an output start timing of the second safety input signal from the second determination unit become substantially the same, The threshold value adjustment and holding unit may be configured to adjust the first threshold value and the second threshold value such that a difference between the output start timing of the first safety input signal from the first determination unit and the output start timing of the second safety input signal from the second determination unit as measured when a distance to the operation unit detected by the first detection unit and a distance to the operation unit detected by the second detection are the same falls within a predetermined range.

Further, the switch apparatus may be configured to determine, when the operation unit moves a predetermined distance, the first threshold value and the second threshold value based on the first and second detection signals received at a point of time when a threshold value determination signal which commands starting the adjustment of the first and second threshold values is received from a threshold value determination command unit.

Further, the numerical control system includes the above-described switch apparatus, and the numerical control apparatus including a comparison unit that compares the first safety input signal outputted from the first determination unit and the second safety input signal outputted from the second determination unit, and a safety monitoring unit that as a result of a comparison by the comparison unit, determines that the machine tool is normal when the first safety input signal and the second safety input signal coincide, and determines that the machine tool is abnormal when the first safety input signal and the second safety input signal do not coincide.

BRIEF DESCRIPTION OF THE DRAWINGS

The present invention will be understood more clearly by referring to the following accompanying drawings.

DETAILED DESCRIPTION

A switch apparatus that generates safety input signals and a numerical control system will be described below with reference to the drawings. It should be understood that the invention is not limited to the drawings or embodiments described below.

Figure 1:
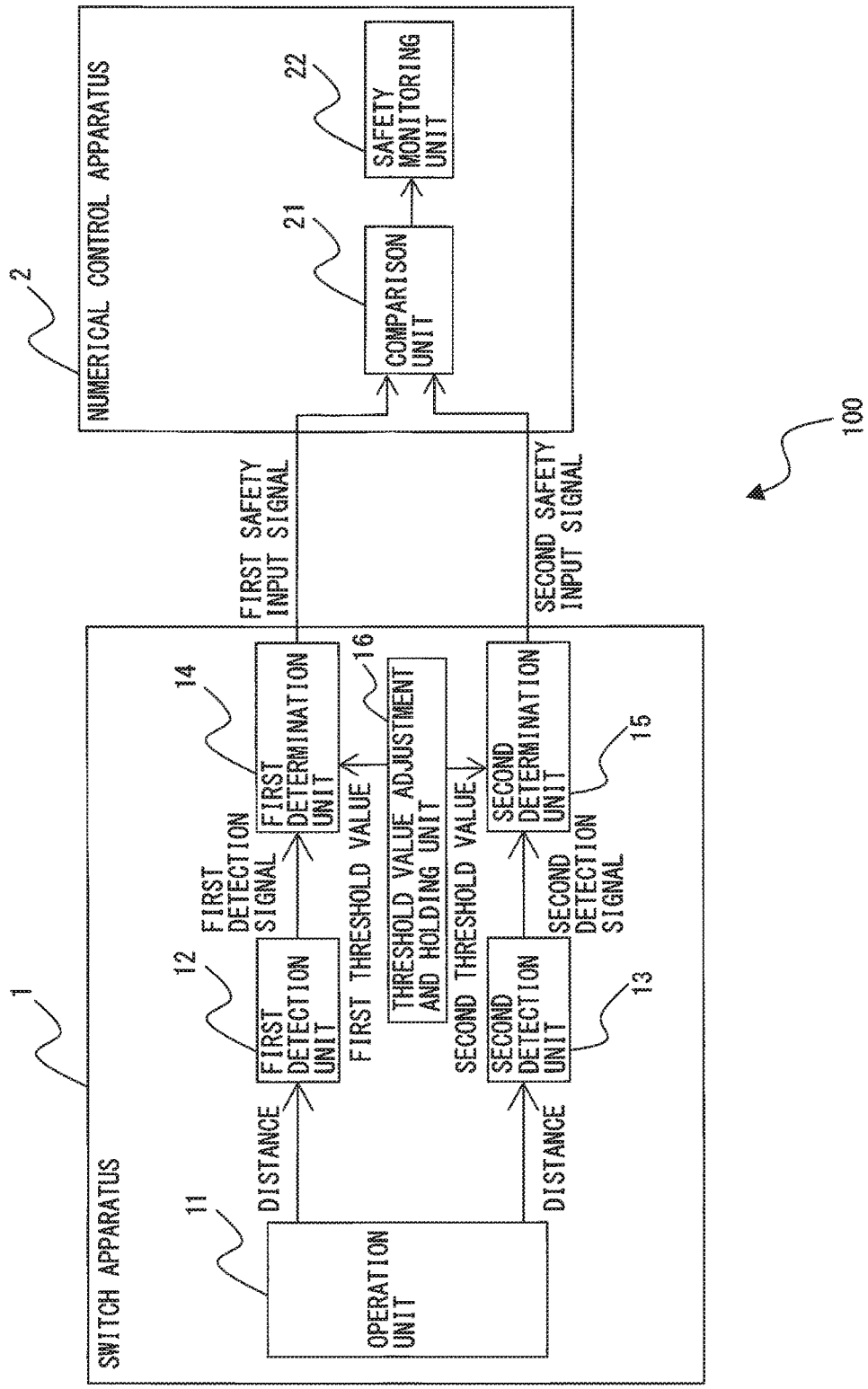
FIG. 1 is a block diagram illustrating a switch apparatus and a numerical control system according to an embodiment.
Figure 2:
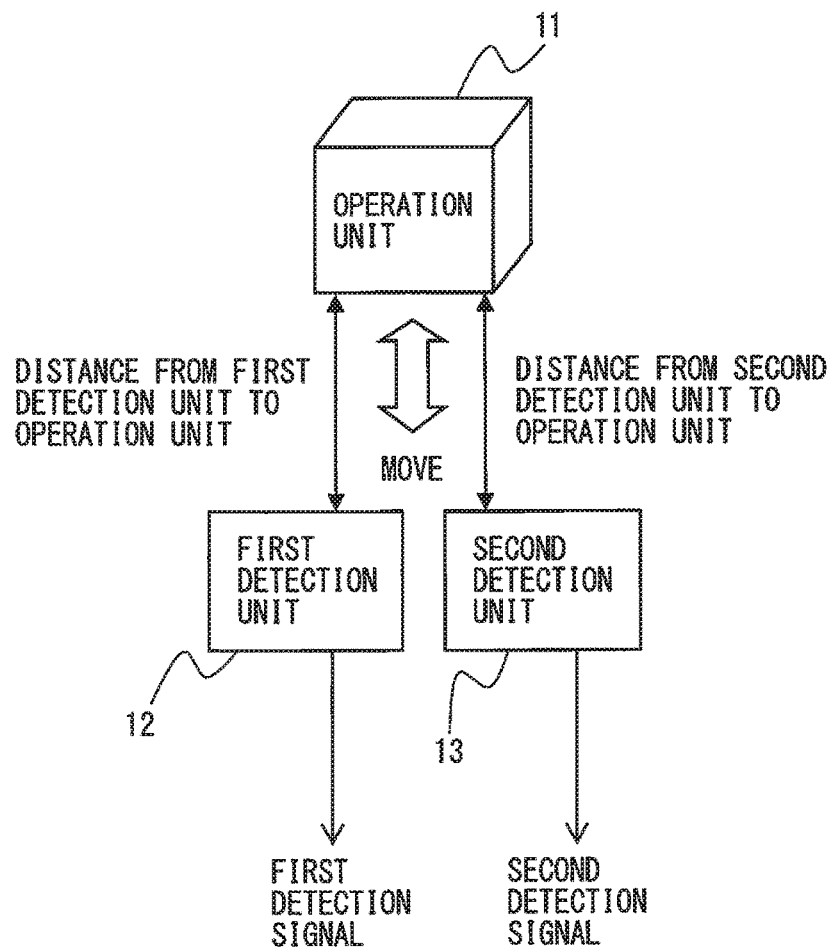
FIG. 2 is a schematic view illustrating a relationship between an operation unit and a first detection unit and a second detection unit.

FIG. 1 is a block diagram illustrating a switch apparatus and a numerical control system according to an embodiment. Further, FIG. 2 is a schematic view illustrating a relationship between an operation unit and a first detection unit and a second detection unit.

According to the embodiment, a numerical control system 100 includes a switch apparatus 1 and a numerical control apparatus 2. In this connection, there is omitted illustration of a machine tool main body controlled by the numerical control system 100.

The numerical control apparatus 2 includes a comparison unit 21 and a safety monitoring unit 22. The comparison unit 21 compares a first safety input signal outputted from a first determination unit 14 in the switch apparatus 1, which will be described below, and a second safety input signal outputted from a second determination unit 15 in the switch apparatus 1. The safety monitoring unit 22 determines, as a result of the comparison by the comparison unit 21, that the machine tool is normal when the first safety input signal and the second safety input signal coincide, and that the machine tool is abnormal when the first safety input signal and the second safety input signal do not coincide.

The switch apparatus 1 generates safety input signals, which will in turn be inputted to the numerical control apparatus 2 to monitor a safety function of the machine tool. To this end, the switch apparatus 1 includes an operation unit 11, a first detection unit 12, a second detection unit 13, a first determination unit 14, a second determination unit 15, and a threshold value adjustment and holding unit 16.

The operation unit 11 has a structure movable in one direction, and provided singly in the switch apparatus 1. The operation unit 11 is configured by a mechanical switch movable in one direction depending on presence or absence of depression. A first detection unit 12 and a second detection unit 13 are provided as being spaced apart by a predetermined distance from the operation unit 11 and substantially on an extension line of the direction of movement of the operation unit 11.

The first detection unit 12 detects a distance to the operation unit 11 (i.e., a distance between the first detection unit 12 and the operation unit 11) and outputs it as a first detection signal to the first determination unit 14. The second detection unit 13 detects a distance to the operation unit 11 (i.e., a distance between the second detection unit 13 and the operation unit 11) and outputs it as a second detection signal to the second determination unit 15. The first and second detection units 12 and 13 are configured by a proximity sensor that contactlessly detects a distance to a detected object. Examples of the proximity sensor include magnetic type, induction type, electrostatic capacitance type, ultrasonic type, and photoelectric type ones, but the type of the proximity sensor per se does not particularly limit the present invention, and any of them may be used.

The first determination unit 14 outputs the first safety input signal when the first detection signal received from the first detection unit 12 is greater than or equal to a first threshold value, and does not output the first safety input signal when the first detection signal is smaller than the first threshold value. The second determination unit 15 outputs the second safety input signal when the second detection signal received from the second detection unit 13 is greater than or equal to a second threshold value, and does not output the second safety input signal when the second detection signal is smaller than the second threshold value. The first threshold value used for the determination process in the first determination unit 14 and the second threshold value used for the determination process in the second determination unit 15 are adjusted and held by the threshold value adjustment and holding unit 16 which will be described subsequently. Incidentally, it is preferable that in a state in which the operation unit 11 is not moving, the distance between the operation unit 11 and the first determination unit 14 and the distance between the operation unit 11 and the second determination unit 15 be substantially the same.

The threshold value adjustment and holding unit 16 adjusts and holds the first threshold value and the second threshold value such that when the operation unit 11 moves a predetermined distance, the output start timing of the first safety input signal from the first determination unit 14 and the output start timing of the second safety input signal from the second determination unit 15 are substantially the same.

The first and second threshold values will be described here in greater detail.

Figure 3:
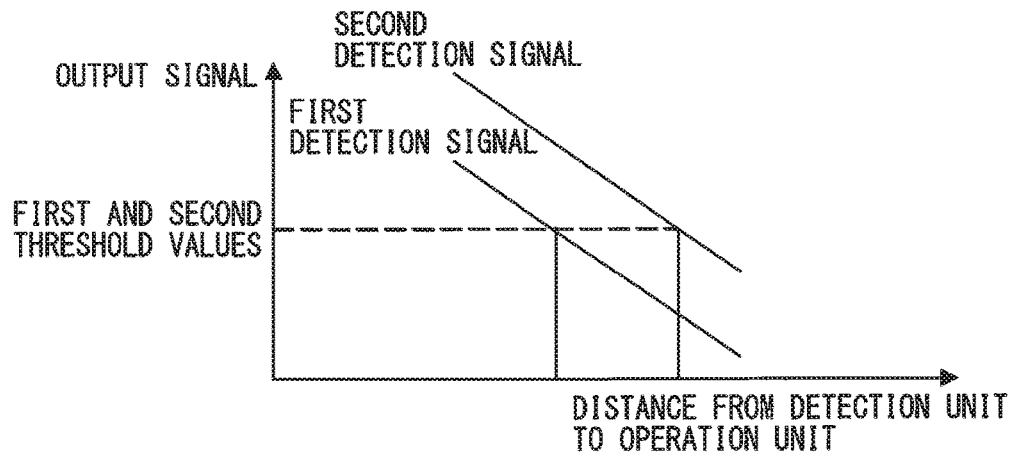
FIG. 3 is a view illustrating by way of example a first detection signal outputted from the first detection unit and a second detection signal outputted from the second detection unit.
Figure 4:
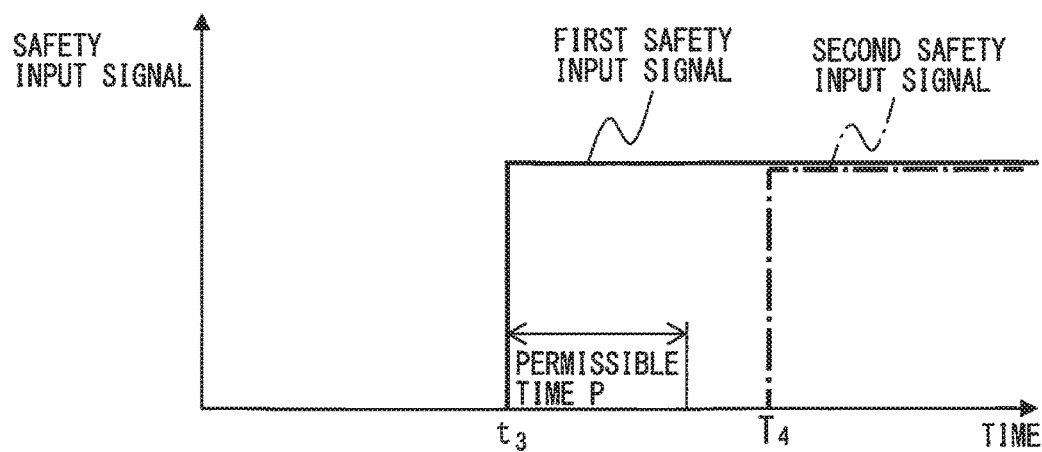
FIG. 4 is a view illustrating output start timings of a first and a second safety input signal when a first threshold value and a second threshold value are equal to each other in the state of FIG. 3.

FIG. 3 is a view illustrating by way of example the first detection signal outputted from the first detection unit and the second detection signal outputted from the second detection unit, and FIG. 4 is a view illustrating the output start timings of the first and second safety input signals when the first and second threshold values are equal to each other. The first detection signal outputted from the first detection unit 12 and the second detection signal outputted from the second detection unit 13 correspond to the distance between the first detection unit 12 and the operation unit 11 and the distance between the second detection unit 13 and the operation unit 11, respectively, and thus represent the tendency of a decreasing function in which the longer the distances, the more decrease the levels of the detection signals. However, due to the structure of the operation unit 11 and the difference in characteristics between the first and second detection units 12 and 13 or the like, and due to the difference between the distance between the operation unit 11 and the first detection 12 and the distance between the operation unit 11 and the second detection unit 13, as illustrated in FIG. 3, the first detection signal outputted from the first detection unit 12 and the second detection signal outputted from the second detection unit 13 become different from each other. Assuming that the first threshold value and the second threshold value are set to be equal, as illustrated in FIG. 4, the first safety input signal outputted as a result of the determination process by the first determination unit 14 and the second safety input signal outputted as a result of the determination process by the second determination unit 15 become different from each other in respect of their "output start timing". The reason is that there is a direct reflection of the influences due to the structure of the operation unit 11, the difference in characteristics between the first detection unit 12 and the second detection unit 13 or the like, and the difference between the distance between the operation unit 11 and the first detection unit 12 and the distance between the operation unit 11 and the second detection unit 13. In FIG. 4, by way of example, a case is illustrated in which the first safety input signal is outputted from the first determination unit 14 at a time $t_3$ and the second safety input signal is outputted from the second determination unit 15 at a time $t_4$. As illustrated in FIG. 4, the time period during which the safety input signals are not coincident with each other is "$t_4$-$t_3$", and thus there is a possibility that the time period exceeds a permissible time P. When such first and second safety input signals are inputted to the numerical control apparatus 2, it is erroneously determined by the numerical control apparatus that "the machine tool is abnormal", even though the machine tool is normal. Therefore, in the present embodiment, the threshold value adjustment and holding unit 16 is configured to adjust and hold the first and second threshold values such that when the operation unit 11 moves a predetermined distance, the output start timing of the first safety input signal from the first determination unit 14 and the output start timing of the second safety input signal from the second determination unit 15 become substantially the same. Specifically described as follows.

Figure 5:
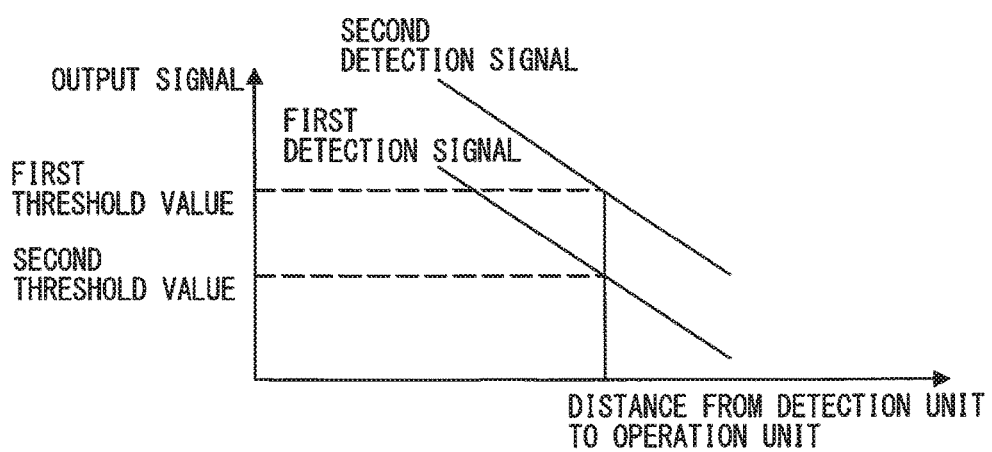
FIG. 5 is a view illustrating by way example the first detection signal outputted from the first detection unit and the second detection signal outputted from the second detection unit.
Figure 6:
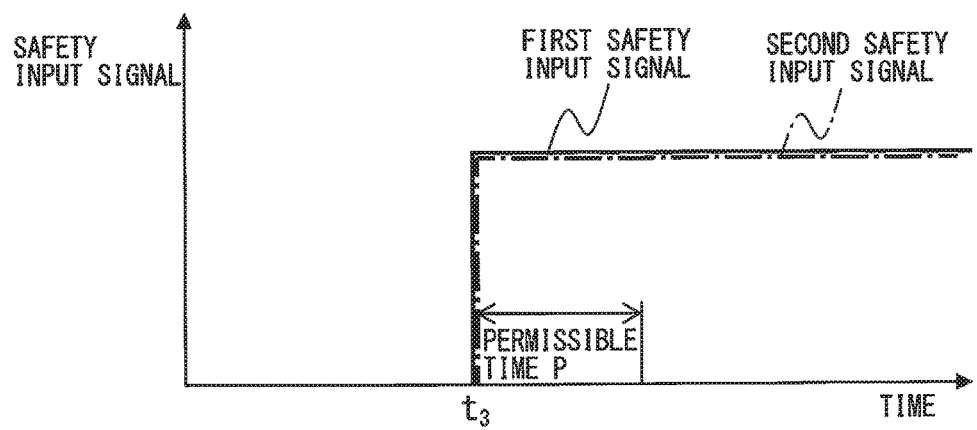
FIG. 6 is a view illustrating a case in which the first threshold value and the second threshold value are adjusted such that the output start timings of the first and second safety input signals are substantially the same in the state of FIG. 5.

FIG. 5 is a view illustrating, by way of example, the first detection signal outputted from the first detection unit and the second detection signal outputted from the second detection unit, and FIG. 6 is a view illustrating a case in which the first and second threshold values are adjusted such that the output start timings of the first and second safety input signals become substantially the same in the state of FIG. 5. As illustrated in FIG. 5, the threshold value adjustment and holding unit 16 sets the first and second threshold values such that when the distance between the operation unit 11 and the first detection unit 12 and the distance between the operation unit 11 and the second detection unit 13 are the same so that the output start timings of the first and second safety input signals become substantially the same, the output start of the first safety input signal from the first determination unit 14 and the output start of the second safety input signal from the second determination unit 15 are performed at the same time. In other words, the threshold value adjustment and holding unit 16 adjusts the first and second threshold values such that the difference between the output start timing of the first safety input signal from the first determination unit 14 and the output start timing of the second safety input signal from the second determination unit 15, which is measured when the distance to the operation unit 11 detected by the first detection unit 12 and the distance to the operation unit 11 detected by the second detection unit 13 are the same as illustrated in FIG. 5, falls within a predetermined range (FIG. 6). As a result of the adjustment by the threshold value adjustment and holding unit 16 of the first and second threshold values, as illustrated in FIG. 6, when the output start timing of the first safety input signal from the first determination unit 14 and the output start timing of the second safety input signal from the second determination 15 occur simultaneously at the time $t_3$, there is no time during which the safety input signals are not coincident with each other, and thus there is no possibility that the numerical control apparatus 2 erroneously determines that "the machine tool is abnormal" even though the machine tool is normal.

It is conceivable that the above-mentioned threshold value adjustment and holding unit 16 is configured as an analog circuit which is composed of a variable resistor whose resistance value is varied by rotating a control knob and a constant voltage source and from which an electric signal based on the amount of rotation of the control knob. In this instance, the electric signal based on the amount of rotation of the control knob corresponds to the first threshold value and the second threshold value. In a state in which the operation unit 11 is moved, the output start timing of the first safety input signal from the first determination unit 14 and the output start timing of the second safety input signal from the second determination unit 15 are observed by an oscilloscope or the like, and the control knob is adjusted such that the difference between the output start timing of the first safety input signal and the output start timing of the second safety input signal falls within a predetermined range.

Figure 7:
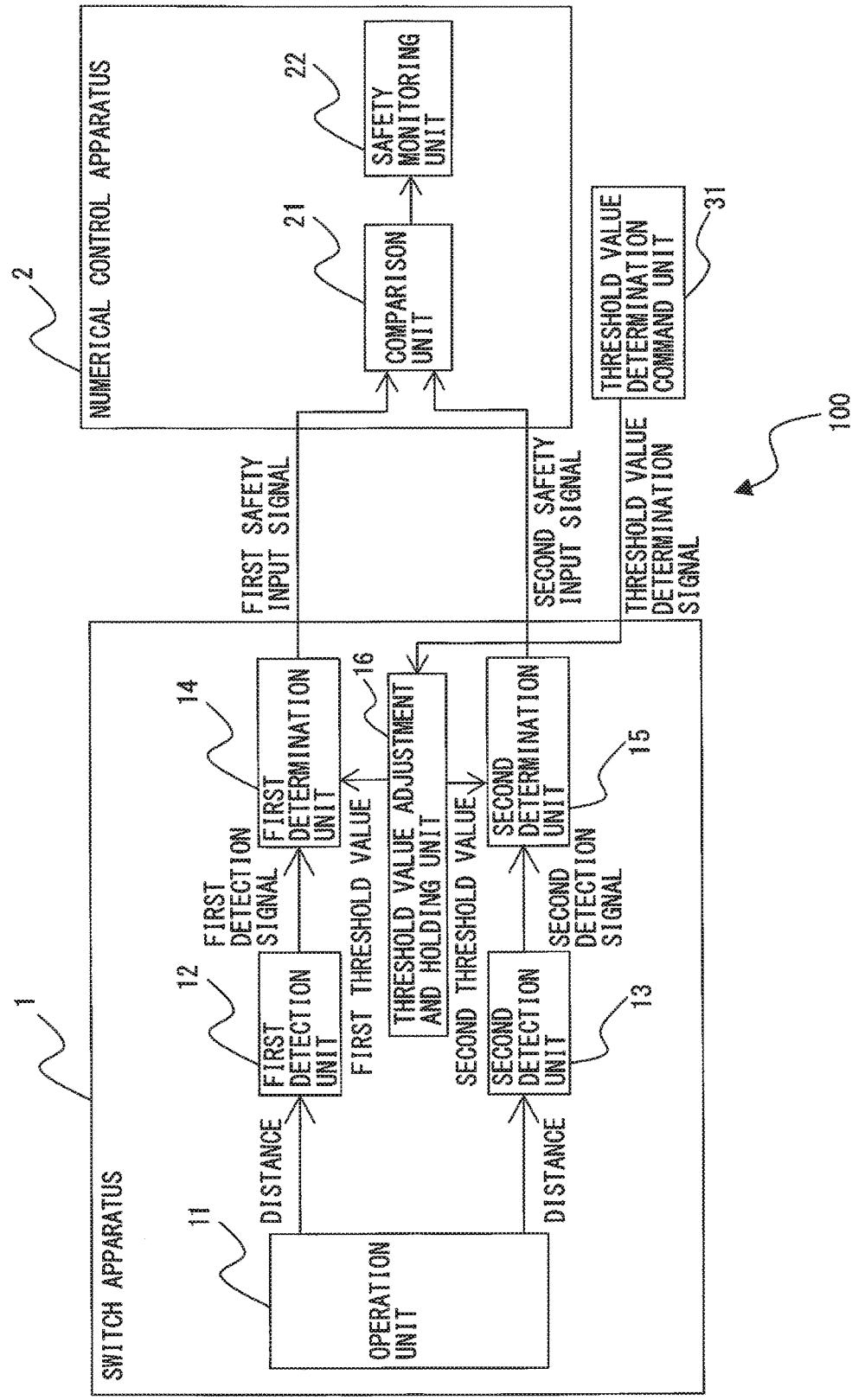
FIG. 7 is a block diagram illustrating a switch apparatus and a numerical control system according to a modified example of the embodiment.
Figure 8:
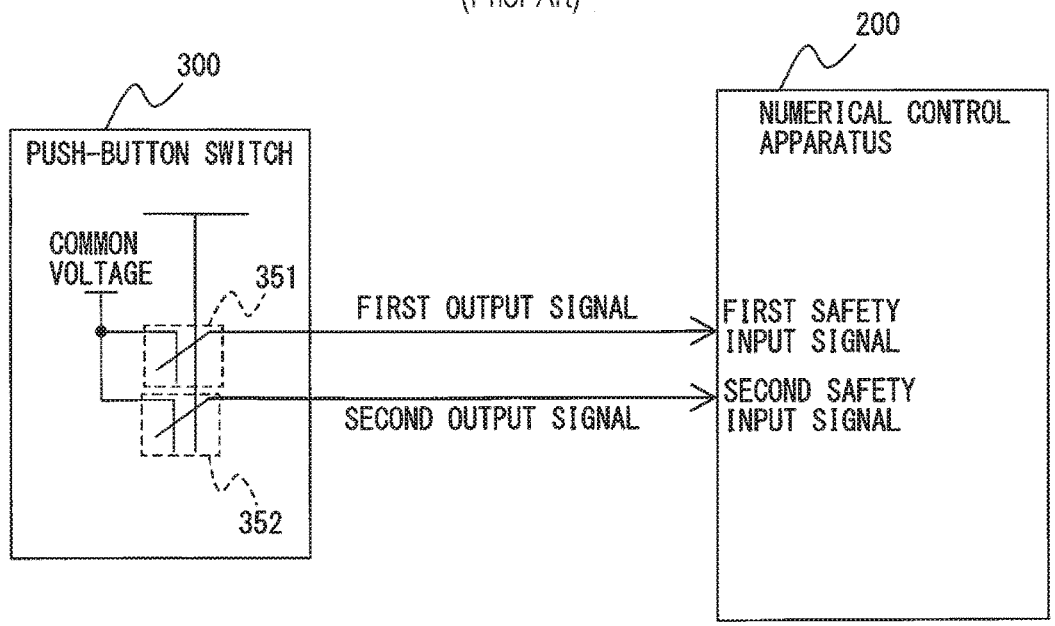
FIG. 8 is a view for explaining a conventional technique for full monitoring of a machine tool based on safety input signals generated by a push button switch.
Figure 9:
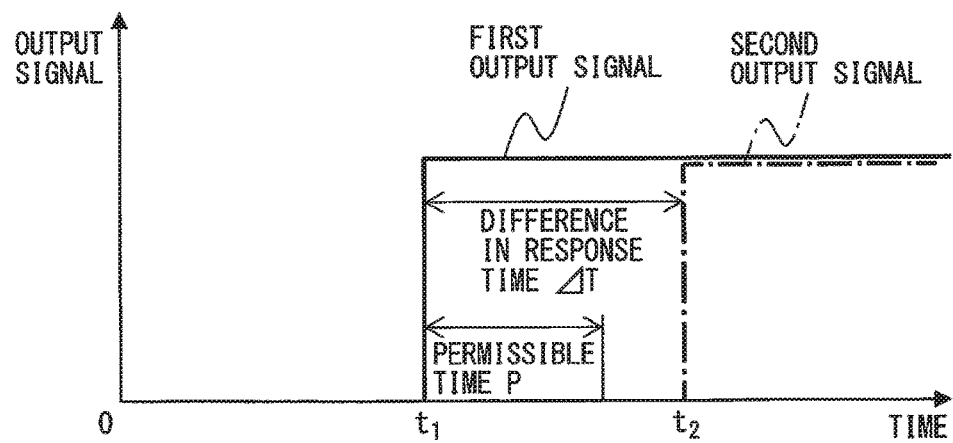
FIG. 9 is a view illustrating by way of example a difference in response time between the safety input signals generated by the push button switch illustrated in FIG. 8.

Alternatively, the above-mentioned threshold value adjustment and holding unit 16 may be configured as a digital circuit composed of an arithmetic unit (not illustrated) for adjusting the first threshold value and the second threshold value and a storage unit (not illustrated) for holding the first threshold value and the second threshold value as adjusted. FIG. 7 is a block diagram illustrating a switch apparatus and a numerical control system according to a modified example of the embodiment. According to the modified example, when the operation unit 11 moves a predetermined distance, the threshold value adjustment and holding unit 16 starts the adjustment by the above threshold value adjustment and holding unit 16 of the first threshold value and the second threshold value based on the first detection signal and the second detection signal which are received at a point of time when a threshold value determination signal that commands starting the adjustment of the first and second threshold values is received from a threshold value determination command unit 31. As the above threshold value determination command unit 31, a switch is conceivable, for example. Upon operation of the switch, the threshold value determination signal is outputted. Incidentally, although, in the illustrated example, the threshold value determination command unit 31 that generates the threshold value determination signal for commanding the threshold value adjustment and holding unit 16 to start the adjustment of the first and second threshold values is provided externally of the switch apparatus 1, it is also possible, as an alternative, that the threshold value determination command unit 31 is provided internally of the switch apparatus 1. In the modified example illustrated in FIG. 7, circuit components other than the threshold value determination command unit 31 are similar to the circuit components illustrated in FIG. 1; therefore, identical circuit components are assigned identical reference numerals, and a detailed description of such circuit components is omitted.

According to the present invention, it is possible to realize a switch apparatus that generates safety input signals inputted to a numerical control apparatus in order to accurately monitor the safety function of a machine tool, and a numerical control system including such a switch apparatus.

According to the present invention, the first threshold value and the second threshold value are adjusted and held such that when the operation unit moves a predetermined distance, the output start timing of the first safety input signal from the first determination unit and the output start timing of the second safety input signal from the second determination unit become substantially the same, so that there is no time during which the two safety input signals are not coincident with each other when the machine tool is normal, and thus it is possible to avoid the erroneous determination that "the machine tool is abnormal" as in the conventional art, and to accurately monitor the safety function of the machine tool.

What is claimed is:

1. A numerical control system, comprising:
    a numerical control apparatus; and
    a switch apparatus that generates safety input signals to be inputted to the numerical control apparatus in order to monitor a safety function of a machine tool, the switch apparatus comprising:
        an operation unit that is movable in one direction;
        a first detection unit that detects a first distance from the first detection unit to the operation unit and outputs the first distance as a first detection signal;
        a second detection unit that detects a second distance from the second detection unit to the operation unit and outputs the second distance as a second detection signal;
        a first determination circuit that outputs a first safety input signal when the first detection signal is greater than or equal to a first threshold value and does not output the first safety input signal when the first detection is smaller than the first threshold value;
        a second determination circuit that outputs a second safety input signal when the second detection signal is greater than or equal to a second threshold value and does not output the second safety input signal when the second detection signal is smaller than the second threshold value; and
        a threshold value adjustment and holding unit that adjusts and holds the first threshold value and the second threshold value such that when the operation unit moves a predetermined distance, an output start timing of the first safety input signal from the first determination circuit and an output start timing of the second safety input signal from the second determination circuit become the same,
    the numerical control apparatus comprising a processor which
        compares the first safety input signal outputted from the first determination circuit and the second safety input signal outputted from the second determination circuit, and
        determines, as a result of the comparison, that the machine tool is normal when the first safety input signal and the second input signal coincide and that the machine tool is abnormal when the first safety input signal and the second safety input signal do not coincide.

2. The numerical control system according to claim 1, wherein the threshold value adjustment and holding unit adjusts the first threshold value and the second threshold value such that a difference between the output start timing of the first safety input signal from the first determination circuit and the output start timing of the second safety input signal from the second determination circuit as measured when the first distance to the operation unit detected by the first detection unit and the second distance to the operation unit detected by the second detection unit are the same falls within a predetermined range.

3. The numerical control system according to claim 2, wherein the threshold value adjustment and holding unit determines, when the operation unit moves the predetermined distance, the first threshold value and the second threshold value based on the first and second detection signals received at a point of time when a threshold value determination signal which commands starting the adjustment of the first and second threshold values is received from a threshold value determination command unit.

* * * * *